United States Patent
Kauffman et al.

[15] 3,699,303
[45] Oct. 17, 1972

[54] EDM PROCESS A METHOD AND APPARATUS FOR CONTROLLING THE FLOW RATE OF DIELECTRIC AS A FUNCTION OF GAP IMPEDANCE

[72] Inventors: Harry D. Kauffman; Malcolm F. Davis, both of Cincinnati, Ohio

[73] Assignee: Cincinnati Milacron Inc., Cincinnati, Ohio

[22] Filed: Oct. 15, 1970

[21] Appl. No.: 80,965

[52] U.S. Cl. ............................................... 219/69 D
[51] Int. Cl. ............................................. B23p 1/08
[58] Field of Search ......... 219/69 D, 69 G, 69 P, 69 S

[56] References Cited

UNITED STATES PATENTS

| | | |
|---|---|---|
| 3,454,737 | 7/1969 | Pfau et al. ............... 219/69 D |
| 3,213,258 | 10/1965 | Ferguson .................. 219/69 P |
| 2,841,686 | 7/1958 | Williams .................. 219/69 G |
| 1,061,612 | 5/1913 | Heroult ............. 219/69 G UX |

Primary Examiner—R. F. Staubly
Attorney—Howard T. Keiser and Alfred J. Mangels

[57] ABSTRACT

A method and apparatus for use in an EDM process for controlling the flow rate of dielectric through a machining gap as a function of the magnitude of gap impedance. An apparatus is provided for detecting variations in the magnitude of gap impedance and producing an output signal representative thereof. The variations in gap impedance are used to change the flow rate of dielectric through the gap. The flow rate may increase thus cleansing the gap of debris, or it may decrease and create a limited concentration of debris to facilitate the breakdown of the gap.

7 Claims, 5 Drawing Figures

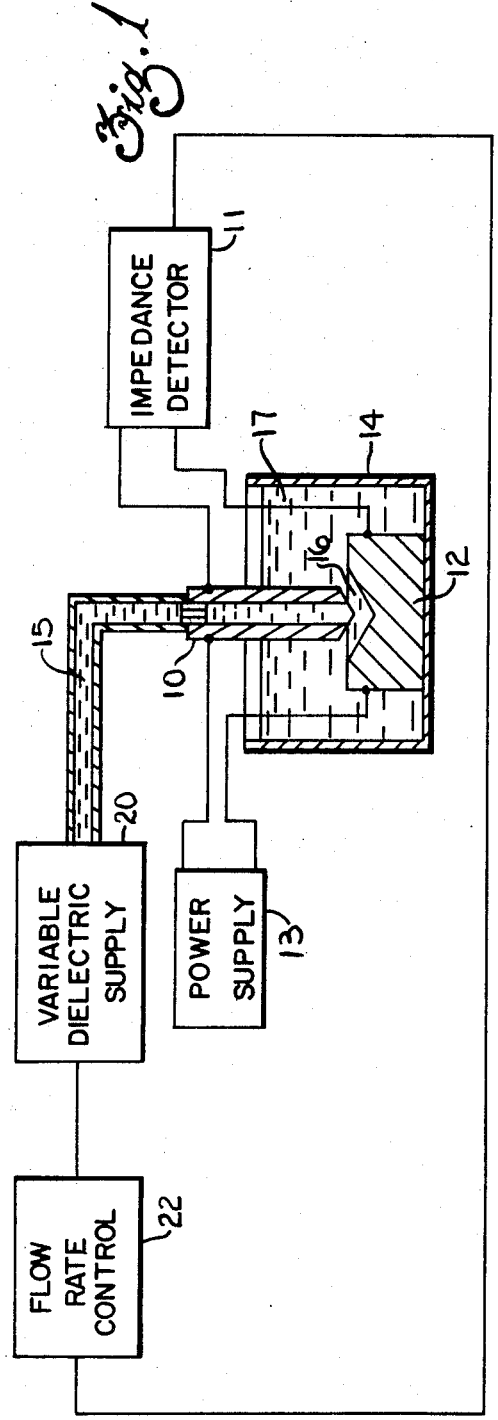
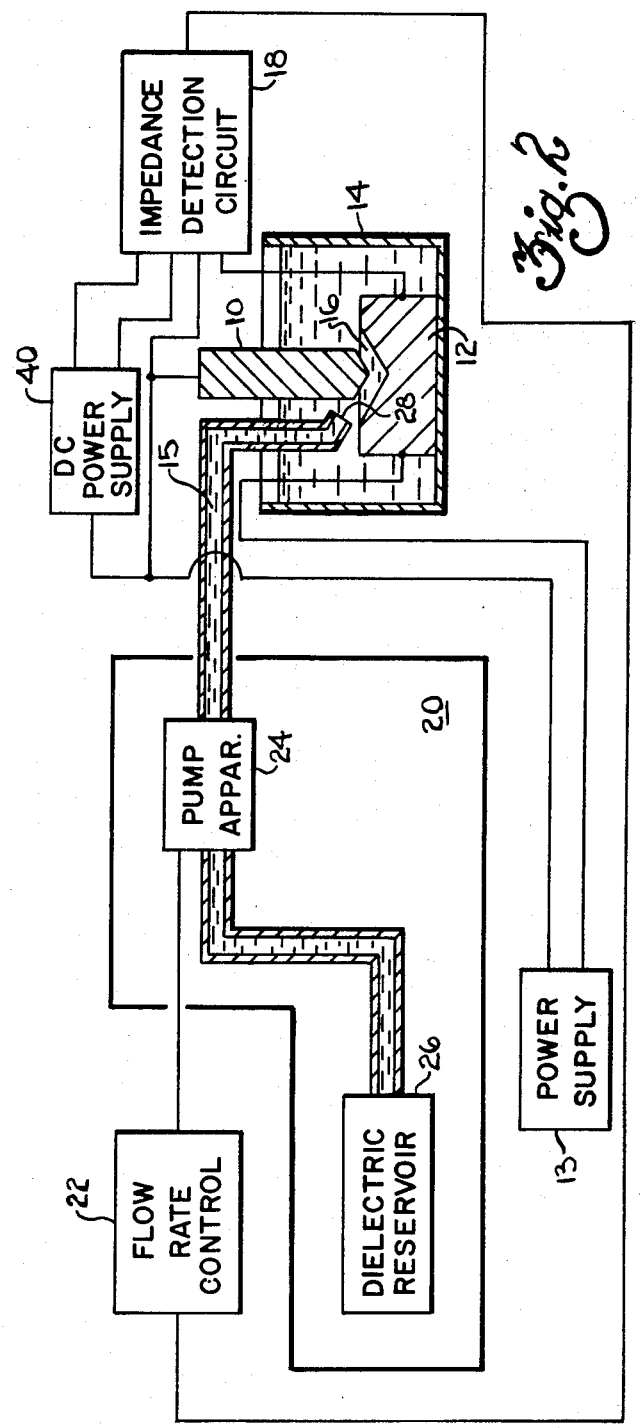

EDM PROCESS A METHOD AND APPARATUS FOR CONTROLLING THE FLOW RATE OF DIELECTRIC AS A FUNCTION OF GAP IMPEDANCE

BACKGROUND OF THE INVENTION

The invention relates generally to an electrodischarge machining (EDM) process and controls therefore and specifically to a dielectric flow rate control dependent on changes in the magnitude of the gap impedance. In the EDM process, metal is removed by passing electrical discharges across the machining gap formed in a dielectric medium between an electrically conductive tool and an electrically conductive workpiece. The discharges are generated by supplying electrical signals from a power supply to the gap. A very critical parameter of the machining process is the conductivity of the machining gap. By maintaining a constant gap impedance, the gap breakdown will occur at a constant voltage level; and a more consistent current flow and metal removal rate can be obtained.

In the past there have been no attempts at controlling the magnitude of gap impedance with changes in dielectric flow. An arbitrary value of flow rate was set by the operator and changed at his discretion. As the machining progressed and accumulations of machined particles and other conditions changed the gap impedance, arcing and short circuits would occur. There are many circuits for detecting sustained arcs and short circuits. Further, there are many theories on how the parameters of the power supply should be changed in response to the detected short circuits. Most of the circuits and theories are valid and moderately effective; however, they only cure the symptoms of the problem and don't attack the problem itself.

The real problem lies in the fact that the gap impedance continuously changes during the machining cycle. These changes are dependent on the material being machined, the type of machining operation being performed, the type of dielectric being used and other factors. Therefore, if the magnitude of gap impedance can be monitored, the cumulative effect of a great many factors can be controlled. Further, if the substance of the gap itself can be materially changed to maintain a constant impedance, a more consistent and trouble free machining process will occur. Further, the number of undesirable arcs and short circuits is greatly reduced. This in turn alleviates the necessity for a great amount of complex short circuit detection and correction circuitry.

This will be made clear by way of some specific examples. Assume one is machining in a roughing operation with relatively high metal removal rates. The machined metal will exist in relatively large particles in the gap. If they are not rapidly removed, the gap impedance will be substantially reduced for subsequent discharges. If a full short circuit does not occur, the subsequent discharges will be consumed in further machining these particles to break them down to a size where they may be removed. If a full short circuit does occur, corrective action will be taken in the power supply and possibly the servo mechanism thus degrading the machining process until the gap is again clear. In either case, the action wastes valuable machining time and does not constitute positive action on the substance of the gap itself.

In other situations, the dielectric may have a high hydrocarbon content. Machining in this type of dielectric causes the formation of amorphic carbons in the dielectric which have a very low impedance characteristic. Any concentration developing in the gap will upset conditions and result in a very poor and inefficient machining process. It can readily be appreciated that these problems are greatly magnified in fine finishing operations where the size of the machining gap is considerably smaller. A further problem is of uncontrolled flow rate of dielectric lies in its abrasive action as it passes the tool electrode and workpiece. This is especially noticeable in fine finishing operations where a relatively complex configuration is being machined, or where it is necessary to maintain the best possible resolution of said configuration.

Applicant proposes a system of controlling the flow rate of dielectric as a function of the gap impedance. Whatever the contributing factors may be, the magnitude of the impedance in the machining gap determines the success of the gap breakdown and the quality of the following discharge. If the gap impedance drops below a predetermined ideal, the flow rate of dielectric can be increased either continuously as a function of the change in impedance, or incrementally in short bursts or pulses. The result is to cleanse the gap of debris and increase the probability of a successful subsequent discharge. Likewise if the gap impedance increases above the predetermined level, the flow rate may be decreased allowing a concentration of debris to accumulate in the gap and enhance the gap breakdown. Therefore, the provision of an automatic flow rate control removes such control from the arbitrary decisions of an operator. Further, the apparatus eliminates the need for a great amount of traditional short circuit detection and correction circuitry. Finally, it operates without any appreciable interruption of the machining process.

SUMMARY OF THE INVENTION

In an EDM process, an apparatus for controlling the flow rate of dielectric to a machining gap formed in the dielectric medium between an electrically conductive tool electrode and an electrically conductive workpiece. The flow rate of dielectric is controlled as a function of the magnitude of gap impedance. An impedance detection circuit is provided for detecting changes in the magnitude of gap impedance and producing an output signal proportional thereto. This signal is coupled to a variable dielectric supply which responds to the signal to increase or decrease the flow rate of dielectric through the machining gap. The change in flow rate is operable to change the substance of the gap itself; and hence, the gap impedance magnitude is maintained at a relatively constant value.

BRIEF DESCRIPTION OF THE DRAWINGS

FIG. 1 is a general block diagram of the disclosed dielectric flow rate control.

FIG. 2 is a block diagram of a first embodiment of the invention providing a continuous control of flow rate of dielectric over a predetermined range of gap impedance.

DESCRIPTION OF THE PREFERRED EMBODIMENTS

Figure 3:
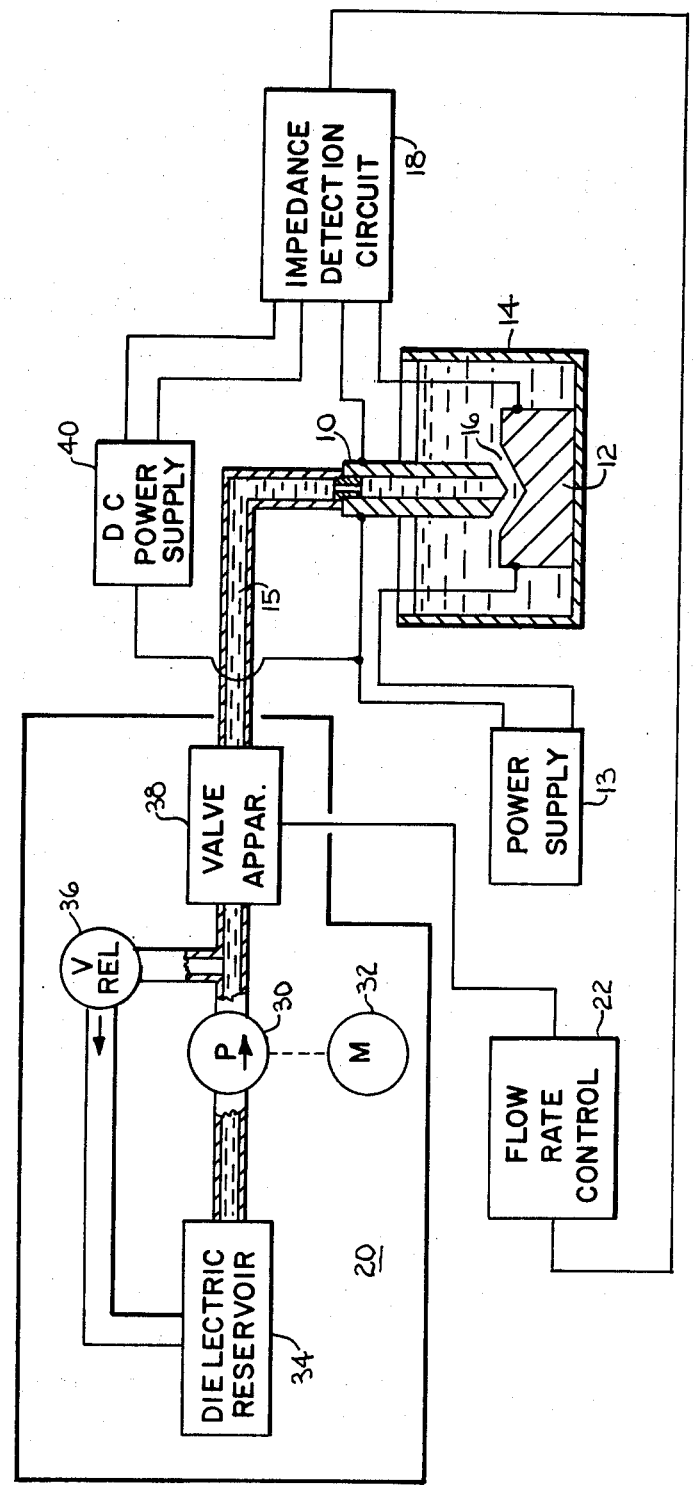
FIG. 3 is a block diagram of a second embodiment of the invention providing a continuous control of flow rate of dielectric over a predetermined range of gap impedance.

FIG. 1 is a general block diagram illustrating the basic information loop of the flow rate control. An electrically conductive tool 10 is shown positioned above an electrically conductive workpiece 12 mounted in a hydraulic tank 14. The tool 10 is positioned to form a machining gap 16 between it and the workpiece 12. The position of the tool is controlled by a servo mechanism control which is not shown. These controls are well-known to those who are skilled in the art, and any type of position control may be used with this invention. Connected to the tool 10 and workpiece 12 is an EDM power power supply 13. The power supply design may be of any type supplying signals across the gap that are operative to intermittantly ionize the gap and produce a discharge or current flow thereacross. In this manner, these signals or machining pulses result in the removal of material from the workpiece. Power supplies for generating machining pulses are well-known, and further discussion will not aid the disclosure of applicant's invention. An impedance detector 11 is connected across the machining gap and is responsive to the magnitude of electrical impedance in the gap 16 between the tool 10 and the workpiece 12. The detector may be of any type that provides an output signal that changes continuously or in discrete increments as a function of changes in the gap impedance magnitude. Such a circuit may be an impedance bridge having at least one detection leg containing the machining gap for detecting the magnitude of impedance continuously or in discrete steps during the time periods between the machining pulses. Likewise, with a potential less than the ionization potential applied to the gap between discharges, the current flow through a series resistor may be measured to indicate the magnitude of gap impedance. Again, this measurement may be taken continuously or sampled between the discharges. Similarly, a resistive circuit containing a small potential source may be electrically connected in parallel with the gap between discharges; and the current flow through said circuit measured as an indication of said gap impedance.

A variable dielectric supply 20 is in fluidic communication with the gap and is used to generate a flow rate of dielectric 15 through the gap 16. The supply 20 may be any configuration of elements that is capable of generating a variable flow rate of dielectric. In general, a single hydraulic pump or a plurality of pumps may be used. If a plurality of pumps is used, the flow rate may be varied by successively energizing and denergizing the pumps. In the case of a single pump, a fixed displacement or a variable displacement pump may be used. Further, a pump in combination with one or more valves can be used to vary the flow rate. With these embodiments, the valves may be placed in series or in parallel with the machining gap. Again, in the case of a plurality of valves, the flow rate may be varied by successively energizing and denergizing the valves; and with a single valve, flow rate variations may be achieved by controlling the valve orifice. A particular embodiment of the variable dielectric supply is not important to the invention and should not be considered a limitation thereon. The only qualification is that the flow rate output be capable of variation in some controllable manner. The control may be continuous from one flow rate value to another, or the control may be in predetermined quantitative increments. More detailed examples will be discussed later in the disclosure. FIG. 1 illustrates that the flow rate output from the supply 20 is in fluidic communication with the gap 16 by passing through the tool 12. This represents a standard flow rate path. However, it is sometimes more practical to supply the dielectric to the gap by discharging it through an orifice in the workpiece or in a turbulent flood through an orifice adjacent to the gap. Finally, any combination of the above configurations may be used to obtain a desired flow rate through the machining gap. The particular path dielectric uses to reach the gap is not important. The only qualification is the configuration chosen must provide some change of flow rate through the machining gap when the flow rate from the dielectric supply changes in value.

It should be noted that FIG. 1 and the remaining Figs. show the tool 10 and the workpiece 12 submerged in a dielectric bath 17. This is a standard practice; however, the Figs. do not show how the bath of dielectric is input and output from the tank 14. There are many methods well-known to those who are skilled in the art for filling and draining tank 14, and further discussion on this point is not necessary to the disclosure of applicant's invention.

Finally, the flow rate control 22 is responsive to the signals from the impedance detector 11 for generating a signal to drive the variable dielectric supply 20. Therefore, the exact configuration of the flow rate control 22 is a function of the type of detector 11 that is used with a particular dielectric supply 20. Its main purpose is to provide an interface for the detector 11 and to generate the proper signal for controlling the variable dielectric supply 20.

FIG. 2 is a block diagram of the invention wherein only a pumping apparatus 24 is used to provide the variable flow rate of dielectric 15 through the gap 16. As in FIG. 1, a power supply 13 generates electrical discharges across the gap 16 between the tool 10 and the workpiece 12. An impedance detector is comprised of a DC power supply 40 and an impedance detection circuit 18. The DC supply 40 has an input connected to one of the outputs of the machining power supply 13 and produces an output current during the times between machining pulses. The impedance detection circuit 18 is energized by the output current of the DC supply 40 and detects changes in gap impedance between machining pulses. The detection circuit 18 produces a signal to the flow rate control 22 which operates in conjunction with the pumping apparatus 24 to change the flow rate accordingly. The pumping apparatus 24 may be a fixed displacement pump driven by a variable speed motor. In this case, the flow rate control 22 is comprised of electric circuits for changing the motor speed which is operative to change the pump speed and the flow rate of dielectric. The pumping apparatus may be comprised of a variable displacement pump with an associated pump drive. In the case of an axial piston pump, the flow rate control is adapted to the pump to provide a cam angle variation. In the case of a radial piston pump, the flow rate control is adapted to provide a porting phase variation. Another variable displacement pump is a vane type pump. In this case, the flow rate control can be adapted to the pump to provide a porting phase adjustment or a cam ring adjustment, either of which are operable to change the flow rate of dielectric to the gap. Finally, it is possible to use a plurality of pumps and successively energize each one, thus providing a flow rate adjustment. It should be noted that the pumping apparatus 24 pumps dielectric from a reservoir 26 to the gap by means of an orifice 28 located adjacent to the gap. This type of dielectric flow is known as turbulent flooding of the gap.

FIG. 3 shows another general embodiment of the variable dielectric supply 20. In this case a pump 30 is driven by a pump motor 32 and operates to pump fluid from the dielectric reservoir 34 to a valving apparatus 38. A pressure relief valve 36 is shunted around the pump 30 thus limiting the pressure that the pump 30 may develop. The valving apparatus 38 is of the type wherein the flow rate through the valve may be varied by changing an orifice or porting configuration therein. For example, a gate valve may be used with a motor connected to the valve stem. The flow rate control 22 is operative to drive the motor in one direction or another thus opening or closing the valve in response to the impedance detection circuit. It would also be possible to use a full proportioning rate valve assembly wherein the flow rate through the valve is controlled electromagnetically. These valves are commercially available. In the case of a rate valve, the flow rate control 22 would again provide the proper signals in response to the impedance detection circuit to move the valve from one position to another thus changing the flow rate. Finally, the valving apparatus 38 may be comprised of a plurality of valves, and the flow rate control 22 would operate to energize or denergize one or more of the valves in response to the impedance detection circuit 18.

Figure 4:
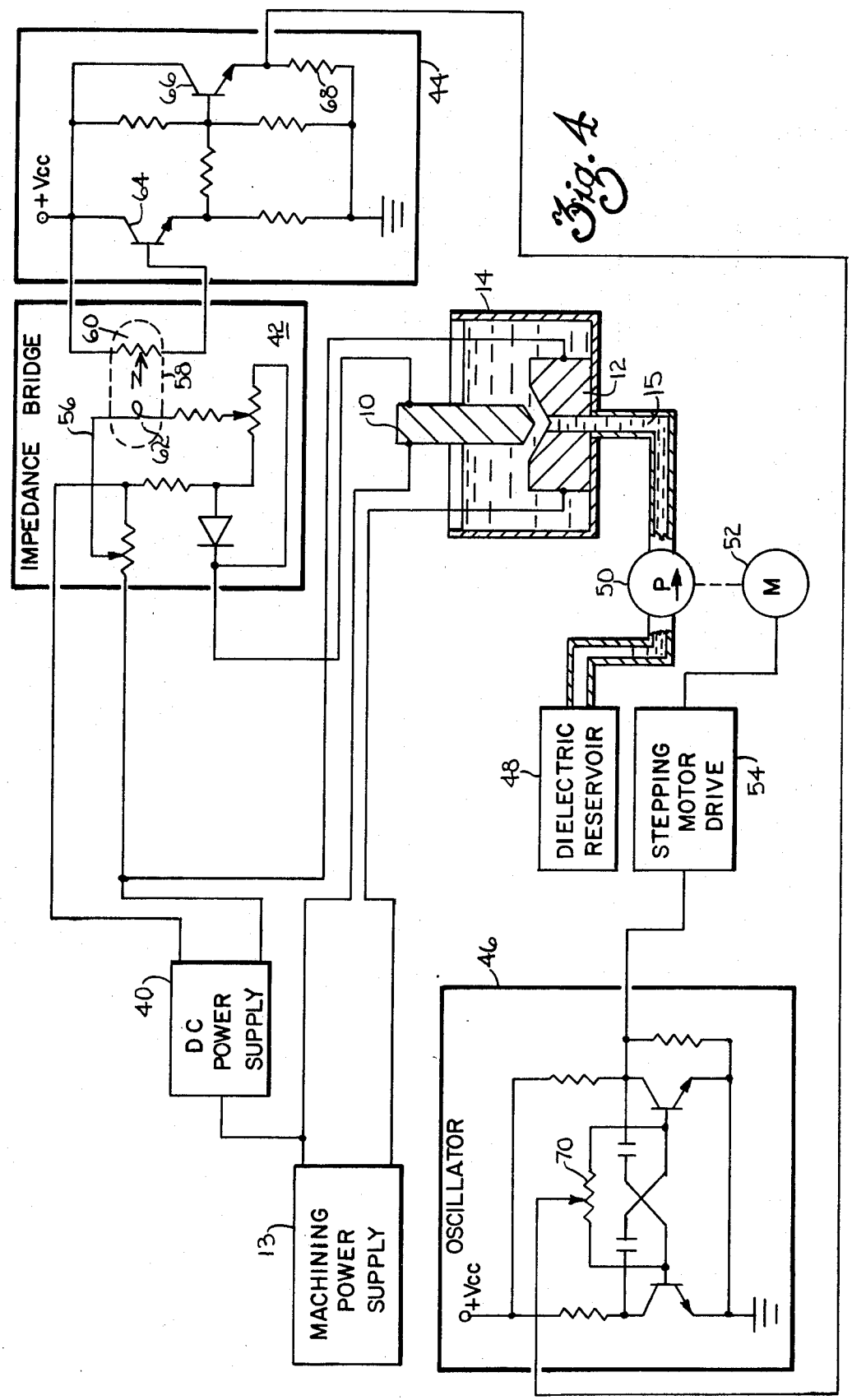
FIG. 4 is a detailed schematic diagram of the first embodiment of the disclosed dielectric flow rate control.

FIG. 4 is a detailed schematic diagram of the first embodiment of the invention. As in the other Figs., the power supply 13 supplies machining pulses to the gap 16 between the tool 10 and workpiece 12. An impedance detector is comprised of a direct current (DC) power supply 40 and impedance bridge 42. The impedance detector supplies a signal for a flow rate control comprised of the amplifier network 44 and voltage controlled oscillator 46. The flow rate control operates with a variable dielectric supply comprised of a dielectric reservoir 48, a fixed displacement pump 50, a stepping motor 52 and a stepping motor drive circuit 54 to change the flow rate of dielectric through the gap 16 in response to the impedance detector. It should be noted that the dielectric 15 is supplied to the gap through an orifice in the workpiece 12. In some applications this may be desirable, and such a flow rate path is compatible with the invention. As will be appreciated by those who are skilled in the art, there are many possible embodiments of a bridge circuit, a voltage control oscillator and a stepping motor drive. Stepping motor drive circuits are supplied by the manufacturer of the stepping motor, and further discussion of these circuits is unnecessary.

The DC power supply 40 is responsive to the output of the power supply 13 so as to only energize the bridge 42 between machining pulses. It is during this time the impedance of the gap 16 is most resistive and an adequate measurement can be taken. This provides the most accurate information as to the gap condition for succeeding pulses. When the initial machining conditions are set up, the bridge 42 is balanced to have a predetermined current flow through the detection leg 56. The detection leg 56 contains a photon coupled isolator 58 that emits light as a function of the magnitude of current flow through the leg 56. The linear range of the isolator 58 determines the predetermined current flow through the center leg 56 when setting up the initial or ideal conditions. The output of the bridge 42 is a receiver 60 of the isolator 58. The receiver 60 has the electrical characteristics of a resistance that changes in magnitude in proportion to the photons transmitted to it by the emitter 62.

The receiver 60 is located in the base circuit of transistor 64 in the amplifier network 44. For the ideal gap impedance, a predetermined current flow through the detection leg 56 will result in a current flow through the receiver 60. This results in conduction through transistor 64 and provides a current flow in the base circuit of transistor 66 thus driving it into conduction. Consequently any changes in current flow through the detection leg 56 will cause a proportional change in voltage across the emitter resistor 68 of transistor 66. This voltage signal is used to control the voltage controlled oscillaoor 46. The specific embodiment of the oscillator is an astable multivibrator. The design and operation of an astable multivibrator as well as other voltage controlled oscillators are well-known to those who are skilled in the art. Briefly, the multivibrator produces a continuous flow of pulses on its output. The symmetry of the output pulse periods is determined by a variable resistor 70. The duration of the output pulse period or frequency is controlled by the magnitude of the current flow through the receiver resistance 60; or consequently, the magnitude of the voltage across the resistor 68. The output pulses are input to the stepping motor drive 54 and are used to control the speed of the stepping motor 52. The motor 52 is mechanically connected to and controls the speed of the pump 50; hence, the flow rate of dielectric 15 to the gap 16. It should be noted the pump drive for the variable dielectric supply could be provided by a hydraulic motor instead of a stepping motor. In this case, a servo amplifier would drive a servo valve in response to the voltage across resistor 68. The servo valve would control the speed of the hydraulic motor, and hence the flow rate of dielectric in response to the magnitude of gap impedance.

The discussion relating to FIG. 4 described a system wherein there is a continuous control of dielectric flow rate over a given range of gap impedance. An alternative embodiment would be to detect predetermined magnitudes of gap impedance and use these outputs to change the flow rate in quantitative increments. For example, the flow rate may be divided into three flow rate conditions for predetermined gap impedance magnitudes. A first gap impedance magnitude would provide a normal flow rate of dielectric to the gap. If the gap impedance increased or decreased a predetermined amount above or below said first impedance magnitude, the flow rate would jump to a corresponding high or low value.

Figure 5:
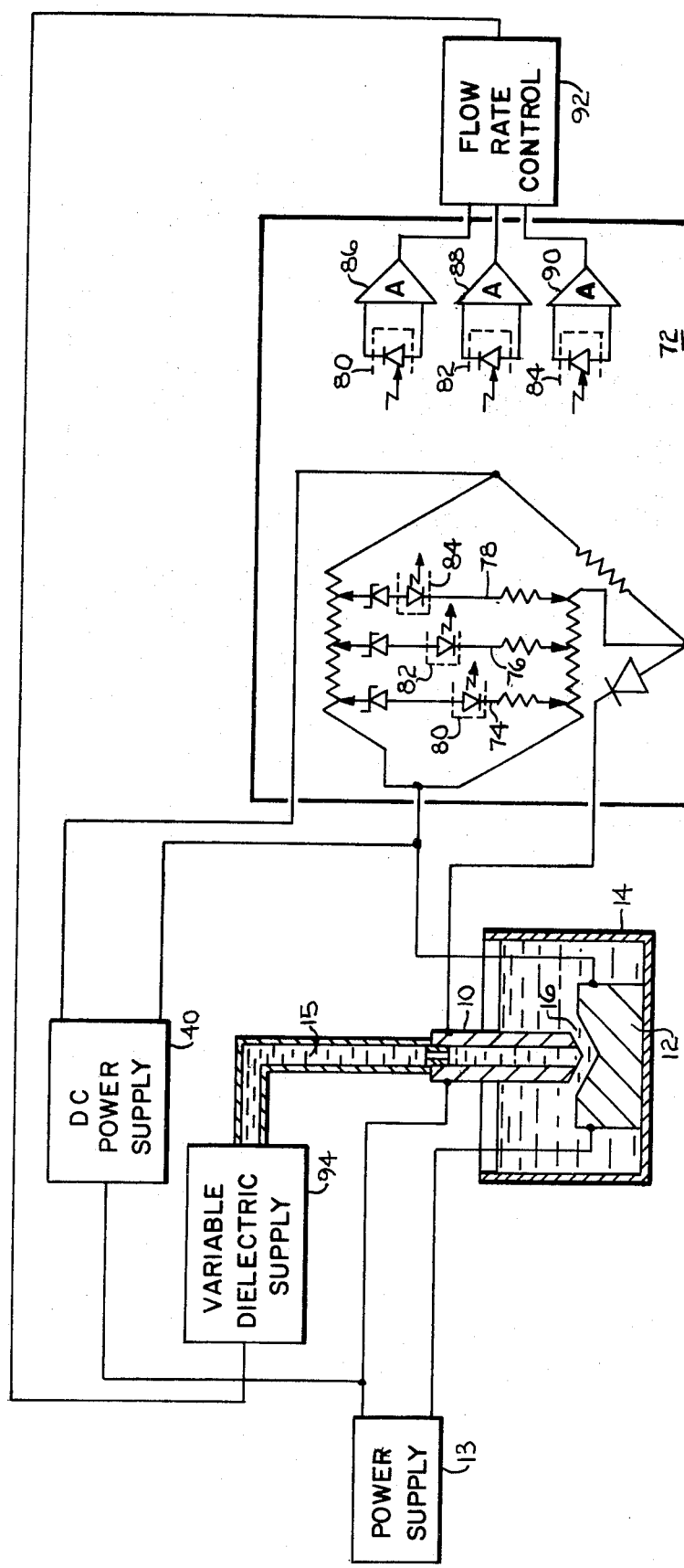
FIG. 5 is a detailed schematic diagram of a third embodiment of the invention providing a control of flow rate in predetermined quantitative increments in response to incremental changes in gap impedance.

FIG. 5 is an embodiment of this case; and again, an impedance bridge 72 is used to illustrate the preferred impedance detection circuit. The bridge 72 is identical in operation to the one earlier described except that it contains three detection legs 74, 76, and 78, respectively, each containing photon coupled diodes 80, 82, and 84. The diodes 80, 82 and 84 produce outputs in response to three predetermined gap impedance magnitudes and are connected to amplifiers 86, 88, and 90. These amplifiers supply outputs from the bridge 72 which are capable of driving a flow rate control 92. The flow rate control 92 operates with a variable dielectric supply 94 to change the flow rate of dielectric 15 through the gap 16. The flow rate control 92 and supply 94 may be a full proportioning hydraulic valve controlling the output of a pump. In this case, the control 92 includes a summing network providing a signal for the valve that increases the valve opening in discrete steps for each input energized. The full proportioning valve and summing network could be replaced by three solenoid valves that are connected in parallel to the pump output and each being responsive to a separate one of the detection outputs. Further, the summing network could provide signal levels to a pump drive motor. Each level being capable of changing the pump speed by a predetermined amount. Likewise, the summing network and variable pump drive could be replaced by three pumps in parallel each responsive to a separate detection signal.

While the invention has been illustrated in some detail according to preferred embodiments shown in the accompanying drawings, and while the preferred illustrated embodiments have been described in some detail, there is no intention to thus limit the invention to such detail. On the contrary, it is intended to cover all modifications, alterations and equivalents falling within the spirit and scope of the appended claims.

What is claimed is:

1. An apparatus for use in an EDM process for controlling a flow rate of dielectric through a machining gap formed in a dielectric medium between an electrically conductive tool and an electrically conductive workpiece, said machining gap being supplied machining pulses from a power supply for generating electrical discharges thereacross, the apparatus comprising:
    a. means in fluidic communication with the machining gap for supplying a flowrate of dielectric thereto;
    b. means connected across the machining gap for detecting changes in electrical impedance in said gap only during time periods between the machining pulses; and
    c. means connected between the detecting means and the supplying means for controlling the flow rate of dielectric through the gap as a function of the detected changes in electrical impedance.

2. An apparatus for use in an EDM process for controlling a flow rate of dielectric through a machining gap formed in a dielectric medium between an electrically conductive tool and an electrically conductive workpiece, said machining gap being supplied machining pulses from a power supply for generating electrical discharges thereacross, the apparatus comprising:
    a. means in fluidic communication with the machining gap for supplying thereto a flow rate of dielectric varying in predetermined quantitative increments;
    b. means connected across the machining gap for detecting predetermined magnitudes of electrical impedance in said gap only during time periods between the applied machining pulses; and
    c. means connected between the detecting means and the supplying means for changing the flow rate by the quantitative increments in response to the detected predetermined magnitudes of electrical impedance.

3. An apparatus for use in an EDM process for controlling a flow rate of dielectric through a machining gap formed in a dielectric medium between an electrically conductive tool and an electrically conductive workpiece, said gap being supplied machining pulses from a machining power supply for generating electrical discharges thereacross, the apparatus comprising:
    a. a dielectric reservoir;
    b. a pumping apparatus connected to the reservoir and in fluidic communication with the machining gap for generating a flow rate of dielectric through the machining gap;
    c. means coupled to the machining power supply for producing a signal during time periods between the electrical discharges;
    d. means having inputs connected across the machining gap and responsive to the signal for detecting electrical impedance changes in the machining gap only during the time periods between the electrical discharges; and
    e. a flow rate control having an input connected to the detecting means and an output connected to the pumping apparatus for controlling the generation of flow rate through the machining gap as a function of the detected changes in electrical impedance.

4. An apparatus for use in an EDM process for controlling a flow rate of dielectric through a machining gap formed in a dielectric medium between an electrically conductive tool and an electrically conductive workpiece, said gap being supplied machining pulses from a machining power supply for generating electrical discharges thereacross the apparatus comprising:
    a. a dielectric reservoir;
    b. a pump connected to the reservoir and producing a flow rate of dielectric;
    c. valving apparatus connected to the pump and in fluidic communication with the machining gap for controlling the flow rate of dielectric through the gap;
    d. means coupled to the machining power supply for producing a signal during time periods between the machining pulses;
    e. means having inputs connected across the gap and responsive to the signal for detecting electrical impedance changes in the gap during the time periods between machining pulses; and f. a control device having an input connected to the detecting means and an output connected to the valving apparatus for varying the flow rate of dielectric through the machining gap as a function of the detected changes in electrical impedance.

5. An apparatus for use in an EDM process for controlling a flow rate of dielectric through a machining gap formed in a dielectric medium between an electrically conductive tool and an electrically conductive workpiece, said gap being supplied machining pulses from a machining power supply for generating electrical discharges thereacross, the apparatus comprising:

a. a variable dielectric supply in fluidic communication with the machining gap for generating a flow rate of dielectric through the gap in a predetermined number of quantitative increments;

b. a direct current power supply coupled to the machining power supply for producing a direct current signal during time periods between machining pulses;

c. an impedance bridge having the machining gap connected in one leg thereof and being responsive to the direct current signal for measuring predetermined incremental changes in electrical impedance in the machining gap; and d. a control device connected to the impedance bridge and the dielectric supply for changing the flow rate in predetermined quantitative increments as a function of the incremental changes in electrical impedance.

6. A method for use in an EDM process for automatically controlling a flow rate of dielectric through a machining gap having electrical machining pulses applied thereto for producing electrical discharges thereacross, the method comprising the steps of:

a. generating a flow rate of dielectric through the machining gap;

b. detecting changes in electrical impedance in the machining gap only during time periods between the applied machining pulses; and c. controlling automatically the generation of flow rate of dielectric as a function of the changes detected in the electrical impedance.

7. A method for use in an EDM process for controlling a flow rate of dielectric through a machining gap having electrical machining pulses applied thereto for producing electrical discharges thereacross, the method comprising the steps of:

a. generating a flow rate of dielectric through the machining gap;

b. detecting predetermined increments of electrical impedance magnitudes in the machining gap only during time periods between the applied machining pulses; and c. changing the generation of flow rate in quantitative increments as a function of the detected increments of impedance magnitudes.

* * * * *